United States Patent [19]

Motoyoshi

[11] 4,453,167

[45] Jun. 5, 1984

[54] PRINTER WITH INK CORRECTING RIBBON

[75] Inventor: Junichi Motoyoshi, Funabashi, Japan

[73] Assignee: Canon Kabushiki Kaisha, Tokyo, Japan

[21] Appl. No.: 405,308

[22] Filed: Aug. 4, 1982

Related U.S. Application Data

[63] Continuation of Ser. No. 260,388, May 4, 1981, abandoned.

[30] Foreign Application Priority Data

May 14, 1980 [JP] Japan ................................ 55-63791

[51] Int. Cl.$^3$ ......................... G01D 15/10; B41J 3/20; B41J 11/60; B41J 29/36

[52] U.S. Cl. ............................... 346/76 PH; 400/120; 400/696; 400/697; 400/697.1

[58] Field of Search ................... 346/76 PH; 400/120, 400/151, 171, 299, 466, 696, 697, 697.1, 240.1

[56] References Cited

U.S. PATENT DOCUMENTS 3,866,736 2/1975 Ozimek et al. ...................... 400/697
4,120,594 10/1978 Howard ............................ 400/697
4,307,968 12/1981 Habich et al. ...................... 400/171
4,307,971 12/1981 Kane et al. ......................... 400/697
4,390,297 6/1983 Gaitos et al. .................. 400/120 X

FOREIGN PATENT DOCUMENTS 53-67241 6/1978 Japan .................................. 400/120

OTHER PUBLICATIONS

Delaney, J. D., Resistive Ribbon Correction Method, IBM Technical Disclosure Bulletin, vol. 23, No. 8, Jan. 1981, p. 3866.

*Primary Examiner*—George H. Miller, Jr.
*Attorney, Agent, or Firm*—Fitzpatrick, Cella, Harper & Scinto

[57] ABSTRACT

A printer has a head mounted on a carriage moving on and along guide rails for printing. An error correcting head is further provided on the carriage.

3 Claims, 4 Drawing Figures

PRINTER WITH INK CORRECTING RIBBON

This is a continuation of application Ser. No. 260,388, filed May 4, 1981, now abandoned.

BACKGROUND OF THE INVENTION

1. Field of the Invention

This invention relates to a printer, wherein printing is done on a recording sheet.

2. Description of the Prior Arts

The capability of correcting printed information heretofore has not been provided in conventional printers, or if provided, has been relatively expensive. It has also been a practice to prevent occurrence of any erroneous printing by examining the information to be printed using a separate display device before it is printed, or, in the case of a device of the ink transfer type, the recording sheet as printed is slightly moved forward to erase the erroneous print with an eraser, etc., after which the recording sheet is returned to its original position for accurate printing. In the former case of advance checking by a display device, relatively large expense is involved in installing such device and the printing operation is inefficient, while, in the latter case, the recording sheet should be shifted back and forth for erasure of the erroneous print and for correct printing, which is undesirably time-consuming and complicated in operation.

SUMMARY OF THE INVENTION

In view of the above-noted inherent disadvantages in conventional printers, it is an object of the present invention to provide a printer capable of readily correcting errors in printing.

It is another object of the present invention to provide a printer which is simple in construction and can be manufactured at a low cost.

It is still another object of the present invention to provide a printer capable of correcting erroneous prints without failure.

DESCRIPTION OF PREFERRED EMBODIMENTS

Figure 1:
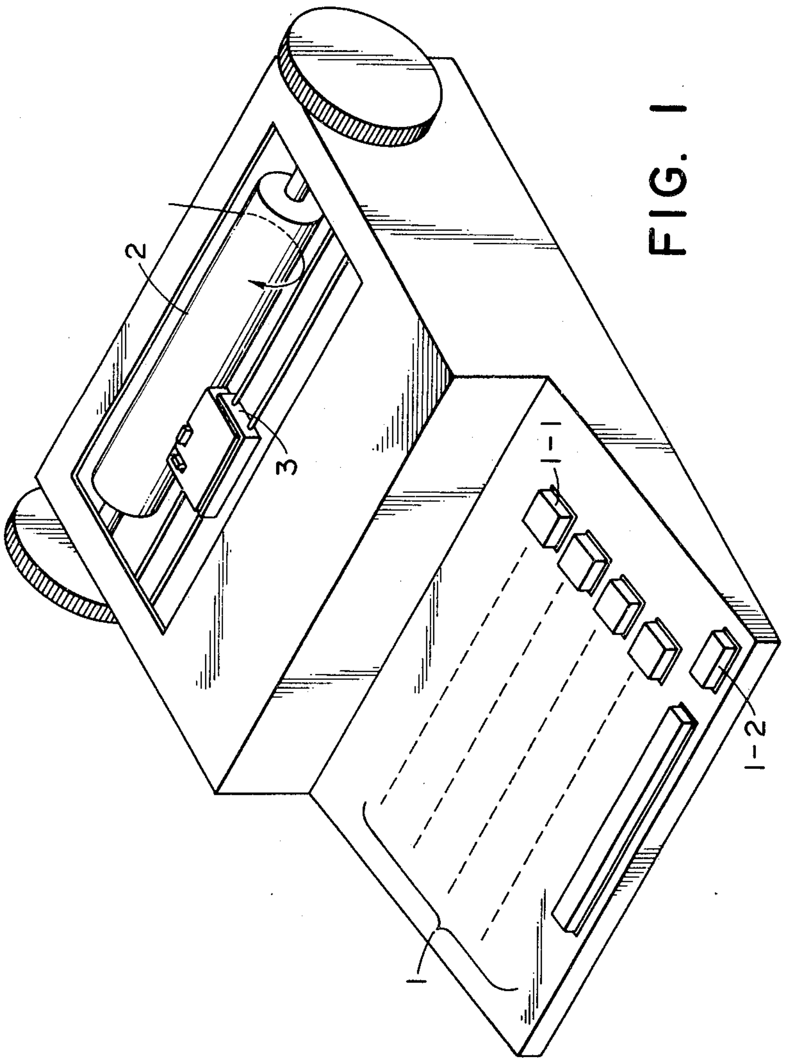
FIG. 1 is a general perspective view of an electronically operated office machine incorporating therein one preferred embodiment of the printer according to the present invention.

FIG. 1 illustrates an electronically operated office machine such as a typewriter, in which a printer such as a thermal printer according to one embodiment of the present invention is incorporated. A keyboard section 1 having various input keys for numbers, characters, and so forth arranged therein is provided on a front sloping surface part of the electronic machine. The contents of the input information as entered through these keys are recorded on a recording sheet by the thermal printer. A printing mechanism comprising a platen 2, a carriage 3, etc. is disposed on the upper rear section of the printing machine, the details of which are shown in FIG. 2.

Figure 2:
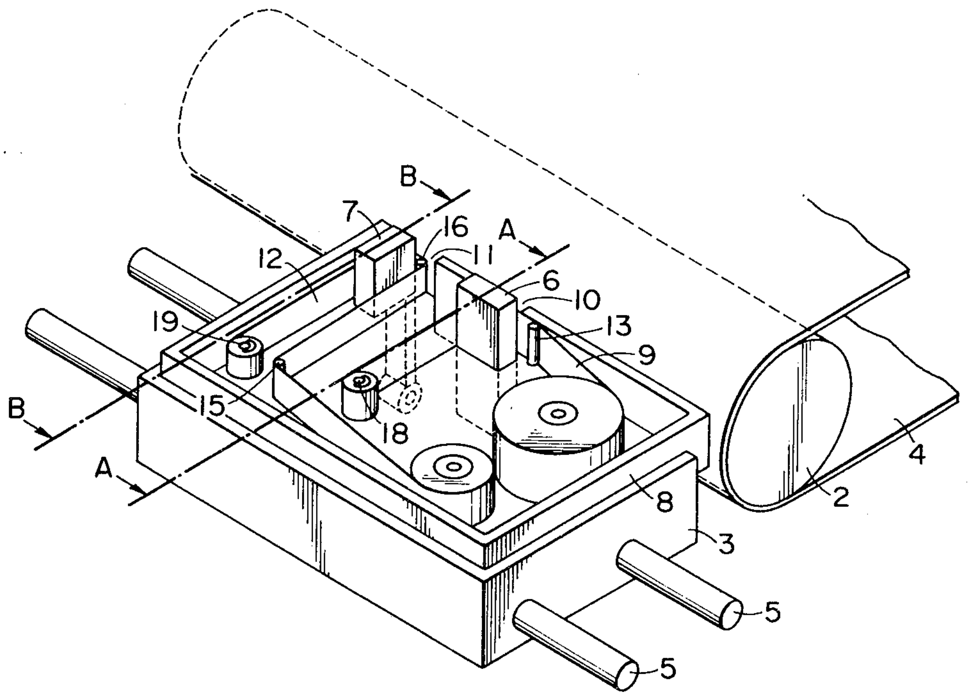
FIG. 2 is an enlarged perspective view of the printer mechanism shown in FIG. 1.

Referring to FIG. 2, the platen 2 holds a recording sheet 4 on the peripheral surface thereof. In parallel with the platen 2, a pair of guide rails 5, 5 are arranged, on and along which the carriage 3 slidingly moves back and forth. The carriage 3 can be returned a predetermined number of places by actuation of a return switch 1—1 on the keyboard 1. The carriage 3 accommodates therein, side by side, a thermal head 6 which comprises a plurality of heat producing elements for printing, and a percussion hammer 7 for error correction which rotationally strikes the platen 2, both being disposed along the axial direction of the platen and spaced apart a predetermined space equal to one or more print places. The striking face of the hammer 7 is either flat or concave with a large radius of curvature. During printing, the thermal head 6 urges a printing ink ribbon 9 (to be described later) toward the recording sheet 4 on the platen 2, and transfers the printing ink in conformity with the shape of characters, symbols, etc. to the recording sheet 4 by selective driving of the heat producing elements. When not printing, the thermal head 6 stays at a position away by a certain distance from the recording sheet. A ribbon cassette 8 is mounted on the carriage 3 in a manner to be detachable from or attachable to it. In this cassette 8, there are formed notches 10 and 11 for receiving therein the thermal head 6 and the percussion hammer 7, when the cassette 8 is mounted on the carriage 3, so as to enable both head 6 and hammer 7 to contact the recording sheet 4. Within the cassette 8, there are accommodated separate rolls of printing ink ribbon 9 and error correcting ribbon 12 bearing white ink on it. These rolls of ribbons 9, 12 are respectively guided to the notched portions 10, 11 by guide rollers 13, 14 ("14" being not shown) and guide rollers 15, 16, 17 ("17" being not shown), and then taken up on rollers 18, 19. Though not shown in the drawing, the ribbon cassette is usually shielded on its top surface with a cover.

Figure 3:
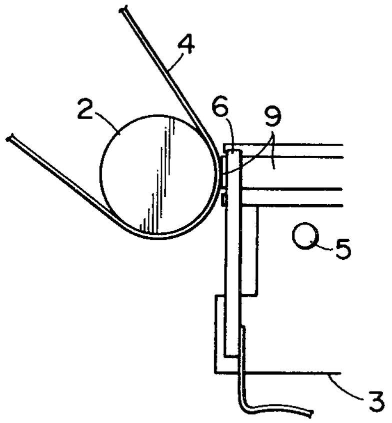
FIG. 3 is a cross-sectional view of the printer mechanism taken along a line A—A in FIG. 2.

FIG. 3 illustrates a cross-sectional view of the thermal printer of FIG. 2 taken along a line A—A, wherein the thermal head 6 is urged onto the recording sheet 4 with the ink ribbon interposed between. When the thermal head 6 becomes hot by conduction of electric current, ink is transferred to the recording sheet 4.

Figure 4:
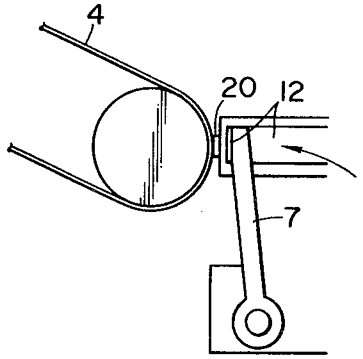
FIG. 4 is also a cross-sectional view of the printer mechanism taken along a line B—B in FIG. 2.

FIG. 4 also shows a cross-sectional view of the thermal printer of FIG. 2 as viewed along a line B—B. The error correcting ribbon 12 and the hammer 7 are usually disposed away from the recording sheet 4. Only at the time of correcting the print errors, i.e., only when an error correcting switch 1-2 on the keyboard is depressed, is the hammer 7 rotated in the direction of the arrow to transfer white ink on the error correcting ribbon 12 to a misprinted portion 20, thereby erasing the error. The area for the white ink transfer should sufficiently cover the erroneous printing of characters, symbols, etc.

In the above-described manner, erroneous printing can be corrected easily and satisfactorily with a device of simple construction having a error correcting impact hammer provided on the carriage to strike an error correcting ribbon.

In the above-described embodiment of the thermal printer according to the present invention, the error correcting ribbon is of such a type that white correction ink is held on a ribbon material. It should however be noted that, besides such correction ribbon, there may be used a ribbon of a type which holds tenaciously thereon an adhesive material, like an adhesive tape, so that the print ink can be peeled off the recording sheet upon urging of the ribbon onto the erroneously printed character. Further, the print error correcting means is not limited to the impact hammer, but rather the thermal head may be used in conjunction with a ribbon bearing thereon a hot-melt correction ink as the error correcting ribbon.

What I claim is:

1. A thermal printer for use with apparatus including a platen, comprising:

(a) a thermal head provided with heat generating elements energizable toward the surface of the platen;

(b) a carriage mounting thereon said thermal head and being mounted to move said thermal head in parallel with the platen; and (c) an error correcting head mounted on said carriage and moving in parallel with said platen.

2. The thermal printer as set forth in claim 1, further comprising means for disposing an error correcting ink ribbon between said correcting head and the platen and wherein said error correcting head comprises hammer means for striking the platen through the error correcting ink ribbon.

3. The thermal printer as set forth in claim 2, wherein said hammer means includes a striking surface that is made substantially flat.

* * * * *